United States Patent
Ok et al.

(10) Patent No.: US 12,194,431 B2
(45) Date of Patent: Jan. 14, 2025

(54) CHITOSAN-BIOCHAR COMPOSITE FIBER FOR EFFECTIVE REMOVAL OF PHOSPHORUS FROM AQUEOUS SOLUTIONS, MANUFACTURING METHOD THEREFOR, AND PHOSPHORUS ADBSORBENT COMPOSITION COMPRISING SAME

(71) Applicant: Korea University Research and Business Foundation, Seoul (KR)

(72) Inventors: Yong Sik Ok, Seoul (KR); Yoo Ra Cho, Seoul (KR); Yoon E Choi, Seoul (KR); Palansooriya Kumuduni, Seoul (KR); Sok Kim, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 552 days.

(21) Appl. No.: 17/586,176

(22) Filed: Jan. 27, 2022

(65) Prior Publication Data
US 2022/0241751 A1 Aug. 4, 2022

(30) Foreign Application Priority Data
Jan. 27, 2021 (KR) .................. 10-2021-0011291

(51) Int. Cl.
*B01J 20/24* (2006.01)
*B01J 20/28* (2006.01)
(Continued)

(52) U.S. Cl.
CPC ......... *B01J 20/24* (2013.01); *B01J 20/28023* (2013.01); *B01J 20/3007* (2013.01);
(Continued)

(58) Field of Classification Search
CPC ...... B01J 20/20; B01J 20/24; B01J 20/28023; B01J 20/3007; B01J 20/3078;
(Continued)

(56) References Cited

FOREIGN PATENT DOCUMENTS

| AU | 2021103100 | * | 8/2021 | ............. B01J 20/20 |
| CN | 105540726 | * | 5/2016 | ............... C02F 1/28 |

(Continued)

OTHER PUBLICATIONS

Machine translation of Cheng et al. (Year: 2018).*
(Continued)

*Primary Examiner* — Brian A McCaig
(74) *Attorney, Agent, or Firm* — Sughrue Mion, PLLC

(57) ABSTRACT

Disclosed herein are a novel chitosan-biochar composite fiber for effective removal of phosphorus from aqueous solutions, a manufacturing method therefor, and a phosphorus adsorbent composition comprising same. Specifically, disclosed are a method for manufacturing a chitosan-biochar composite fiber for removal of phosphorus from aqueous solutions, a chitosan-biochar composite fiber manufactured by the method, and a phosphorus adsorbent composition comprising same, wherein the method comprises the steps of: (1) pyrolyzing paper mill sludge in a carbon dioxide ($CO_2$) or nitrogen ($N_2$) gas atmosphere to prepare a biochar; (2) mixing the biochar prepared in step (1) with a chitosan solution, together with $FeCl_3 \cdot 6H_2O$, followed by stirring to give a mixture; (3) extruding the mixture in a sodium hydroxide solution with the aid of a needle to gel chitosan; and (4) crosslinking the chitosan gel in a glutaraldehyde solution and rinsing and neutralizing the same to afford a chitosan-biochar composite fiber.

11 Claims, 14 Drawing Sheets

(51) Int. Cl.
  *B01J 20/30* (2006.01)
  *C02F 1/28* (2023.01)
  *C02F 101/10* (2006.01)

(52) U.S. Cl.
  CPC ........... *B01J 20/3078* (2013.01); *C02F 1/286* (2013.01); *C02F 2101/105* (2013.01)

(58) Field of Classification Search
  CPC .......... C02F 1/283; C02F 1/286; C02F 11/10; C02F 2101/105; C02F 2103/28
  See application file for complete search history.

(56) References Cited

FOREIGN PATENT DOCUMENTS

| | | | | |
|---|---|---|---|---|
| CN | 106400200 A | 2/2017 | | |
| CN | 108176368 | * 6/2018 | .............. | B01J 20/24 |
| KR | 10-2012-0127354 A | 11/2012 | | |
| KR | 10-2016-0054938 A | 5/2016 | | |
| KR | 10-2075232 B1 | 2/2020 | | |
| KR | 10-2020-0038656 A | 4/2020 | | |

OTHER PUBLICATIONS

Machine translation of Huang et al. (Year: 2016).*
Office Action dated Oct. 17, 2022 issued by the Korean Patent Office in Korean Application No. 10-2021-0011291.
Office Action dated Oct. 28, 2022 issued by the Korean Patent Office in Korean Application No. 10-2021-0011291.

* cited by examiner

CHITOSAN-BIOCHAR COMPOSITE FIBER FOR EFFECTIVE REMOVAL OF PHOSPHORUS FROM AQUEOUS SOLUTIONS, MANUFACTURING METHOD THEREFOR, AND PHOSPHORUS ADBSORBENT COMPOSITION COMPRISING SAME

BACKGROUND OF THE INVENTION

1. Field of the Invention

The present disclosure relates to a novel chitosan-biochar composite fiber for effective removal of phosphorus from aqueous solutions, a manufacturing method therefor, and a phosphorus adsorbent composition comprising same.

2. Description of the Prior Art

Phosphorus is a constituent for ATP, phospholipids, nucleic acids (DNA or RNA), etc. in organisms, serving as an essential nutrient element for all living creatures on the earth.

With the development of the industry, phosphorus-based chemicals have been extensively used. When released in the form of sewage or waste water into streams, excess phosphorus causes eutrophication which results in raising various environmental problems. In particular, phosphorus is a nutrient responsible for the growth of algae in aquatic systems and promotes the growth of harmful cyanobacteria, causing algal bloom and is also named "limiting nutrient".

If occurring, algal bloom generates an unpleasant odor and exerts fatal influences on water, such as fish mortality, release of harmful cyanotoxins, etc.

In order to prevent and restrain the occurrence of algal blooms in aquatic systems, phosphorus, which is a cause of eutrophication in streams, must be removed.

Examples of currently used phosphorus removal methods include chemical precipitation and biological treatment methods. Chemical precipitation methods exhibit high removal rates and stability, but require high treatment cost with the resultant generation of excess sludge. Biological treatment methods do not guarantee stability because they are labile to treatment environments and conditions.

Adsorption methods are advantageous in terms of relatively consistent yield irrespective of weather and environmental conditions, simple treatment process, excellent reproductivity, and low sludge generation, but are burdened by the problem of increasing in phosphorus removal cost because the active carbon and so on used in conventional adsorption methods are relatively expensive.

Therefore, there is a need for development of a low-cost, eco-friendly adsorptive substance capable of effectively scavenging phosphorus from aqueous solutions.

Biochar, also called bio-charcoal, is a carbon-rich solid yield produced during pyrolysis process that is a thermochemical decomposition of biomass in the absence or limited supply of oxygen and has recently attracted great attention due to its important functions, such as carbon sequestration, renewable energy, waste management, agricultural productivity improvement, environment restoration, etc. However, there is a limit that the adsorption capacity of biochar greatly depends on types of raw materials fed and conditions of pyrolysis.

Particularly, biochar for removal of phosphorus suffers from the disadvantage of being poor in adsorption of anionic contaminants, such as phosphates, due to the repulsive force between biochar surface and phosphate ions.

Accordingly, there is a need for development of improved, novel biochar that can be used to effectively remove phosphorus.

RELATED ART DOCUMENT

Patent Literature (Patent literature 1) Korean Patent Number 10-2075232

SUMMARY OF THE INVENTION

Leading to the present disclosure, intensive and thorough research conducted by the present inventors into the development of a novel adsorbent that can effectively remove phosphorus from aqueous solutions, resulted in the development of a novel substance of chitosan-biochar composite fibers by using paper mill sludge-derived biochar and chitosan, the establishment of a manufacturing method therefor, and the finding that the chitosan-biochar composite fibers can very effectively adsorb phosphorus from aqueous solutions.

Therefore, an aspect of the present disclosure is to provide a method for manufacturing a chitosan-biochar composite fiber for removal of phosphorus from aqueous solutions.

Another aspect of the present disclosure is to provide a chitosan-biochar composite fiber, manufactured by the method of the present disclosure, for removal of phosphorus from aqueous solutions.

A further aspect of the present disclosure is to provide a phosphorus adsorbent composition comprising the chitosan-biochar composite fiber of the present disclosure as an active ingredient.

In order to achieve the goals, the present disclosure provides a method for manufacturing a chitosan-biochar composite fiber for removal of phosphorus from aqueous solutions, the method comprising the steps of: (1) pyrolyzing paper mill sludge in a carbon dioxide ($CO_2$) or nitrogen ($N_2$) gas condition to prepare a biochar; (2) mixing the biochar prepared in step (1) with a chitosan solution, together with $FeCl_3.6H_2O$, followed by stirring to give a mixture; (3) spraying a sodium hydroxide solution over the mixture to gel chitosan; and (4) crosslinking the chitosan gel in a glutaraldehyde solution and rinsing and neutralizing the same to afford a chitosan-biochar composite fiber.

In an embodiment of the present disclosure, the pyrolysis in step (1) may be carried out in a temperature range from 580 to 620° C. with a heating speed of 13-18° C./min.

In an embodiment of the present disclosure, the chitosan solution in step (2) may be a 3-5% (w/w) chitosan solution prepared with an acetic acid solution.

In an embodiment of the present disclosure, $FeCl_3.6H_2O$ in step (2) may be added in an amount 2- to 4-fold greater than the weight of the biochar.

In an embodiment of the present disclosure, the sodium hydroxide solution in step (3) may be a 1.5-2.5 M sodium hydroxide solution.

In an embodiment of the present disclosure, the crosslinking in step (4) may be carried out at a temperature of 20-25° C. for 1-3 hours.

In addition, the present disclosure provides a chitosan-biochar composite fiber, manufactured by the method of the present disclosure, for removal of phosphorus from aqueous solutions.

Furthermore, the present disclosure provides a phosphorus adsorbent composition comprising the chitosan-biochar composite fiber manufactured by the method of the present disclosure as an active ingredient.

In an embodiment of the present disclosure, the phosphorus adsorbent composition is to remove phosphorus from aqueous solutions.

In an embodiment of the present disclosure, the phosphorus adsorbent composition may exhibit an increased phosphorus adsorption efficiency in an acidic condition.

In an embodiment of the present disclosure, the acidic condition may include a pH of 2-4.

Having a phosphorus adsorption potential of very effectively adsorbing phosphorus from aqueous solutions, the chitosan-biochar composite fiber manufactured by the method of the present disclosure using paper mill sludge-derived chitosan and biochar can be advantageously used as a phosphorus adsorbent for removal of phosphorus from aqueous solutions.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Figure 1:
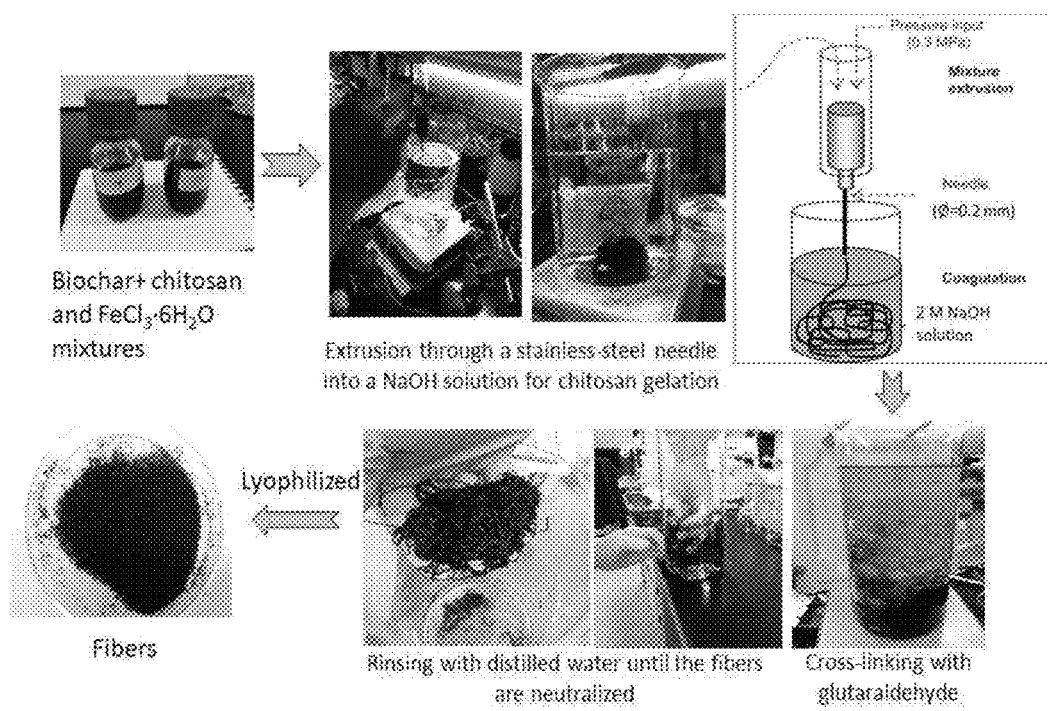
FIG. 1 shows images illustrating processes of manufacturing chitosan-biochar composite fibers according to the present disclosure.

The present disclosure is characterized by providing a method for manufacturing a chitosan-biochar composite fiber, which is a novel substance capable of effectively adsorb and remove phosphorus (P) from aqueous solutions.

In detail, a method for manufacturing chitosan-biochar composite fiber for removal of phosphorus from aqueous solutions according to the present disclosure comprises the steps of: (1) pyrolyzing paper mill sludge in a carbon dioxide ($CO_2$) or nitrogen ($N_2$) gas atmosphere to prepare a biochar; (2) mixing the biochar prepared in step (1) with a chitosan solution, together with $FeCl_3.6H_2O$, followed by stirring to give a mixture; (3) extruding the mixture in a sodium hydroxide solution with the aid of a needle to gel chitosan; and (4) crosslinking the chitosan gel in a glutaraldehyde solution and rinsing and neutralizing the same to afford a chitosan-biochar composite fiber.

Biochar, which is a carbon-based adsorbent, has attracted attention due to its advantages including availability of biomass obtained from nature at low cost, abundant carbon contents, applicability to various environment fields, etc. Having the intrinsic characteristics, such as large surface area, high porosity, and various mineral components, biochar can be used for removing various pollutants such as organic contaminants, heavy metals, and so on.

In the present disclosure, biochar is prepared from paper mill sludge and designed to be used as a raw material for manufacturing an adsorbent for removal of phosphorus from aqueous solutions, thereby providing a new way to reuse waste sludge.

Below, a detailed description is given of the method for manufacturing chitosan-biochar composite fibers for removal of phosphorus from aqueous solutions.

First, paper mill sludge is pyrolyzed to prepare biochars. In this regard, the pyrolysis is carried out with a heating speed of 13-18° C./min in a temperature range from 580 to 620° C. under a carbon dioxide ($CO_2$) or nitrogen ($N_2$) gas atmosphere.

When the heating speed and the temperature are below the lower limits of the respective ranges, the pyrolysis is slightly conducted, with the consequent insignificant achievement of biochar preparation. In contrast, when the heating speed and the temperature exceed the upper limits of the respective ranges, the biochars may be apt to be modified or burned out. Thus, the pyrosis is preferably conducted in the condition.

In an embodiment of the present disclosure, when the paper mill sludge was pyrolyzed in carbon dioxide and nitrogen conditions, the biochars obtained were named BC-C and BC-N, respectively.

After being prepared, the biochar is mixed with a chitosan solution and simultaneously added with $FeCl_3 \cdot 6H_2O$ and then stirred to give a mixture.

In this regard, the surface modification of biochar with a chitosan solution and $FeCl_3 \cdot 6H_2O$ can not only facilitate the granulation of the biochar, but also significantly enhance the adsorption capacity of P.

The chitosan solution may be a 3-5% (w/w) chitosan solution prepared with an acetic acid solution, and $FeCl_3 \cdot 6H_2O$ may be added in an amount 2- to 4-fold greater than the weight of the biochar. In one embodiment of the present disclosure, $FeCl_3 \cdot 6H_2O$ was added in an amount of 10 g, relative to 3.22 g of biochar.

When the amount of $FeCl_3 \cdot 6H_2O$ is beyond the range described above, the chitosan-biochar composite fiber manufactured in the present disclosure exhibits poor adsorption capability.

After completion of the preparation thereof, the mixture is extruded in a sodium hydroxide solution with the aid of a needle to gel the chitosan.

The needle may be 0.2 to 0.4 mm in diameter, and may be a plastic hub needle with a diameter of 0.2 mm.

The sodium hydroxide solution may be a 1.5-2.5 M sodium hydroxide solution. Preferably, a 2 M sodium hydroxide (a pH of ~14) is extruded to gel chitosan.

Afterwards, the gelled chitosan is crosslinked in a glutaraldehyde solution, rinsed, and neutralized to afford a chitosan-biochar composite fiber according to the present disclosure.

The crosslinking reaction is carried out at 20-25° C. for 1-3 hours. After completion of the crosslinking reaction, the crosslinked chitosan is rinsed with distilled water and neutralized by lowering the pH increased by the sodium hydroxide solution.

The chitosan-biochar composite fiber that has undergone the neutralization may be subjected to lyophilization to afford the chitosan-biochar composite fiber of the present disclosure in a powder form.

In an embodiment of the present disclosure, the chitosan-biochar composite fiber produced with the biochars BC-C and BC-N were named FBC-C and FBC-N, respectively.

Moreover, the chitosan-biochar composite fibers prepared through the processes according to the present disclosure were assayed for characteristics and evaluated for phosphorus removal ability (adsorption capability).

Assay results show that the chitosan-biochar composite fibers of the present disclosure adsorb more phosphorus than biochars.

Thus, the chitosan-biochar composite fibers are understood to be far superior in terms of phosphorus adsorption to biochars.

Also, examination was made of factors that have influences on the phosphorus adsorption capacity of the chitosan-biochar composite fibers of the present disclosure. In this regard, phosphorous adsorption capacity was assayed in solutions different in pH.

As a result, the chitosan-biochar composite fibers of the present disclosure exhibited higher phosphorus adsorption efficiency in an acidic condition, with the maximum performance at a pH of 2-4. In addition, the chitosan-biochar composite fibers were observed to adsorb phosphorus in a dose-dependent manner because a greater dose of the adsorbent brings about a higher number of active sites at which the adsorbent can adsorb phosphorus.

Hence, the present disclosure provides a chitosan-biochar composite fiber, manufactured by the method of the present disclosure, for removal of phosphorus from aqueous solutions, and a phosphorus adsorbent composition comprising the chitosan-biochar composite fiber as an active ingredient.

A better understanding of the present disclosure may be obtained via the following examples, which are set forth to illustrate, but are not construed as limiting the present disclosure.

Materials and Methods (1) Materials

Chitosan (low molecular weight, deacetylated chitin (deacetylation degree of 75%-85%), iron (III) chloride hexahydrate ($FeCl_3 \cdot 6H_2O$, 97%)), and potassium dihydrogen phosphate ($KH_2PO_4$, 99.5%) were purchased from Sigma-Aldrich. All reagents were prepared in deionized water. Phosphate stock solutions were prepared by dissolving $KH_2PO_4$ in deionized water. The PMS (paper mill sludge) was obtained from a local paper processing plant (Moorim Paper Co.) in South Korea.

(2) Characterization of Biochar and Chitosan-Biochar Composite Fibers

The surface morphology and elemental composition of biochar and FBC were determined using a field-emission scanning electron microscope (FE-SEM; Quanta 250 FEG) equipped with an energy dispersive spectrometer (SEM-EDS). The SSA, pore volume, pore size, and porosity were determined by the Brunauer-Emmett-Teller (BET) method with a volumetric adsorption analyzer (ASAP 2020, Micrometrics) using $N_2$ adsorption-desorption isotherm analyses at −196° C. Characteristics related to the functional groups of the materials were assessed by determining the changes in the selected elemental signals (C1s and N1s) using XPS. Spectra were collected on a monochromatic Al Kα (1486.7 eV) X-ray source at 40 eV pass energy. Furthermore, the structural properties of carbon in the samples were characterized using a Raman spectrophotometer (LabRam ARAMIS IR2, Horiba Jobin Yvon). The crystallographic structures in the samples were identified by X-ray diffraction (XRD) analysis using Cu Kα (k=1.54° A) radiation at 45 kV within a 2θ range of 278-410.

(3) Adsorption Experiments

Batch experiments were performed in 50 mL polypropylene tubes to assess the P adsorption as affected by initial P concentration, contact time, adsorbent dosage, and solution pH. The four adsorbents (BC-N, BC-C, FBC-N, and FBC-C) were examined for P sorption ability under different conditions. After reaching equilibrium, the suspensions were filtered through a 0.45 μm membrane (syringe) filter; the residual aqueous P content was determined by the ascorbic acid method using a UV-VIS spectrophotometer (Genesys 10S UV-VIS, Thermo Fisher Scientific Solutions LLC). All the experiments were performed at room temperature (24±02° C.) in triplicate.

(3-1) Adsorption Isotherm

Biochar or FBC (chitosan-biochar composite fiber) of 2 g $L^{-1}$ (0.05 g of solid in 25 mL of solution) was mixed with the phosphate solution at 10, 20, 40, 50, 60, and 70 mg P L$^{-1}$ at pH 4. All the vials were sealed and shaken at 120 rpm on a horizontal shaker for 24 h until the apparent equilibrium was reached. At equilibrium, the samples were filtered and the residual P contents were determined.

The equilibrium adsorption capacity was calculated using Eq. 1:

$$Q_e = [(C_0 - C_e) \times V]/M \quad \text{(Eq. 1)}$$

where, $Q_e$ is the P adsorption capacity at equilibrium (mg g$^{-1}$); $C_0$ and $C_e$ are the initial and equilibrium P concentrations (mg P L$^{-1}$), respectively; V is the volume of the solution (L); and M is the mass of adsorbent (g). The adsorption capacity was calculated based on phosphorus content.

(3-2) Adsorption Kinetics

The kinetic tests were conducted using 2 g L$^{-1}$ of adsorbent dosage at pH 4 with 40 mg P L$^{-1}$ of initial P concentration over 24 h. At predetermined time intervals, 1 mL of the suspension was removed from the solution to analyze the P concentration. The P adsorption kinetics data were described by the pseudo-first-order (PFO), pseudo-second-order (PSO), intra-particle diffusion, and Elovich models (SI).

(3-3) Effect of pH and Adsorbent Dosage on P Adsorption

The influence of adsorbent dosage on P adsorption was determined at 1, 2, and 4 g L$^{-1}$ of adsorbent dosages, at pH 4, and an initial P concentration of 40 mg L$^{-1}$. The effect of solution pH was assessed at pH values varying between 2 and 10, initial P concentration of 40 mg L$^{-1}$, and adsorbent dosage of 4 g L$^{-1}$. Herein, the adsorption efficiency of each adsorbent was calculated using Eq. 2:

$$\text{Removal efficiency (\%)} = [(C_0 - C_e)/C_0] \times 100 \quad \text{(Eq. 2)}$$

(4) Phosphorus K-Edge XANES Spectroscopy

Phosphorus K-edge XANES measurements were conducted at Aichi Synchrotron Radiation Center (Aichi, Japan) using a beamline BL6N1 equipped with an InSb (monochromator at ambient temperature under a He atmosphere. The XANES spectra of the samples were collected in fluorescence yield mode. The monochromator was calibrated at the whiteline (2481.7 eV) of K$_2$SO$_4$'s S K-edge X-ray absorption fine structure (XAFS) spectrum. The background and baseline of all spectra were corrected and normalized using the Athena software. Moreover, linear combination fitting (LCF) of the XANES spectra was performed using all possible binary and ternary combinations of the available P reference compounds measured in previous studies (Yamamoto and Hashimoto, 2017; Yamamoto et al., 2018). The reference compounds used for LCF were hydroxyapatite and tricalcium phosphate for P associated with Ca minerals, strengite, P adsorbed on ferrihydrite for P associated with Fe minerals, and variscite and P adsorbed on gibbsite for P associated with Al minerals. The quality of LCF results was quantified through a residual (R) value, after which the top three or four results were reported (SI). The LCF was performed in the relative energy range between −5 and 20 eV.

(5) Statistical Analysis

The adsorption data were presented as mean±standard error. The kinetic and isotherm adsorption models were fitted by non-linear regression using least square method.

Example 1

Preparation of Biochar and Chitosan-Biochar Composite Fibers

Two types of biochars were produced from PMS. Briefly, the biochars were produced at 600° C. at a heating rate of 15° C./min under CO$_2$ and N$_2$ environments and named BC-C and BC-N, respectively.

To fabricate FBC, 4% (w/w) chitosan solution was prepared in a 5% (v/v) acetic acid solution. The prepared chitosan solution (115 g) was mixed with 3.22 g of respective biochars of BC-N and BC-C (<75 µm). Simultaneously, 10 g of FeCl$_3$.6H$_2$O was added to each chitosan/biochar suspension with vigorous agitation. Then, the mixture was extruded through a 0.2-mm diameter plastic hub needle (TAEHA Co., Namyangju, Korea) into a 2 M NaOH solution (a pH of ~14) for chitosan gelation. The FBC was cross-linked in a glutaraldehyde solution (0.6 mL/L) at 25° C. for 2 hours. After the cross-linking reaction, the FBC was rinsed with deionized water several times until it attained a neutral pH, after which it was lyophilized. The FBCs thus produced with BC-N and BC-C were named FBC-N and FBC-C, respectively. The procedure of manufacturing chitosan-biochar composite fibers of the present disclosure is illustrated in FIG. 1.

Example 2

Characterization of Chitosan-Biochar Composite Fibers According to the Present Disclosure <2-1> Surface Morphology and Elemental Composition Analysis Analysis was made of the surface morphologies and elemental compositions of the BC-N and BC-C, which are the biochars prepared from PBS under carbon dioxide and nitrogen atmospheres, respectively, and FBC-N and FBC-C, which are the chitosan-biochar composite fibers prepared using the biochars and chitosan in Example 1.

TABLE 1

Selected surface characteristics of paper mill sludge derived biochar and biochar-chitosan fibers.

| | Sample | | | |
|---|---|---|---|---|
| | BC-N | BC-C | FBC-N | FBC-C |
| Surface area (cm$^2$ g$^{-1}$) | 50.58 | 46.02 | 7.30 | 12.30 |
| Pore volume (cm$^3$ g$^{-1}$) | 0.108 | 0.107 | 0.005 | 0.013 |
| Pore size (nm) | 11.90 | 11.67 | 1.014 | 1.877 |
| Porosity (%) | 17.59 | 21.08 | 3.19 | 2.77 |

BC-N: Paper mill sludge biochar produced under N$_2$ environment;
BC-C: Paper mill sludge biochar produced under CO$_2$ environment.
FBC-N: BC-N + chitosan + FeCl$_3$ fibers;
FBC-C: BC-C + chitosan + FeCl$_3$ fibers.

Referring to the surface characteristic data of the four adsorbents in Table 1, the SSA of BC-N (50.58 cm$^2$ g$^{-1}$) was greater than that of BC-C (46.02 cm$^2$ g$^{-1}$). The SSA of the chitosan-biochar composite fibers (FBCs) manufactured from chitosan and biochars was lower than that of the original biochars (FBC-N: 7.30 cm² g⁻¹; FBC-C; 12.30 cm² g⁻¹).

The pore volume, pore size, and porosity of the biochars and chitosan-biochar composite fibers (FBCs) exhibited a similar trend, with relatively higher values for biochars than FBCs (Table 1). These observations could be attributed to the blockage of biochar pores by chitosan during fiber preparation.

Figure 2A:
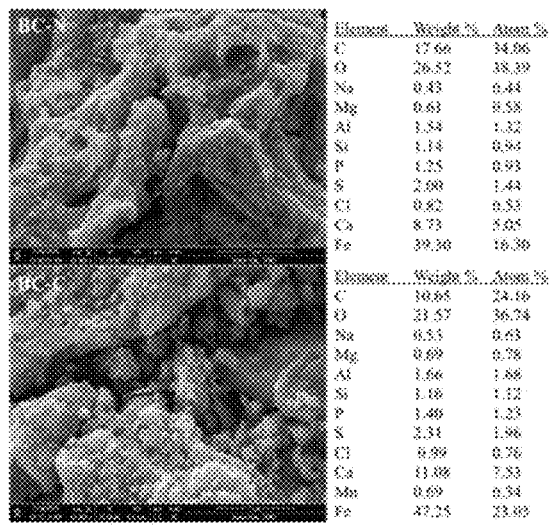
FIG. 2A shows SEM images and SEM-EDS elemental compositions of biochars (BC-N and BC-C) produced from paper mill sludge (PMS) under $N_2$ environment and $CO_2$ environment.
Figure 2B:
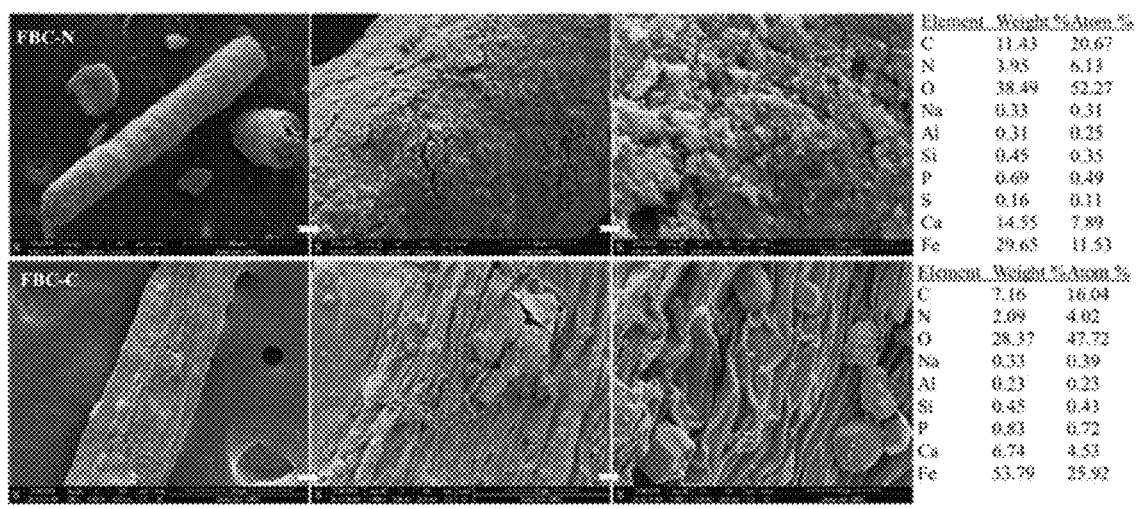
FIG. 2B shows SEM images and SEM-EDS elemental compositions of chitosan-biochar composite fibers (FBC-N and FBC-C) produced from paper mill sludge (PMS) under $N_2$ environment and $CO_2$ environment.

In addition, SEM images and elemental analysis data for the biochars and chitosan-biochar composite fibers (FBCs) are shown in FIGS. 2A and 2B where the pore surfaces of FBCs were observed to be covered and encapsulated.

For elemental compositions, the atomic percentages of elements, namely Mg, Al, Ca, and Fe, that are expected to aid P immobilization, were higher in BC-C than in BC-N. The surface morphology and elemental composition of FBCs were found to be quite different from those of the biochars. FBC-N had a rough surface topography, whereas FBC-C had a wrinkled surface. The wrinkled surface on FBC-C might be the reason for the higher surface area of FBC-C than that of FBC-N, which could lead to increased P adsorption sites.

<2-2> Analysis of Adsorption Functional Groups

The adsorbents prepared in Example 1 were analyzed for adsorption functional groups.

Figure 3:
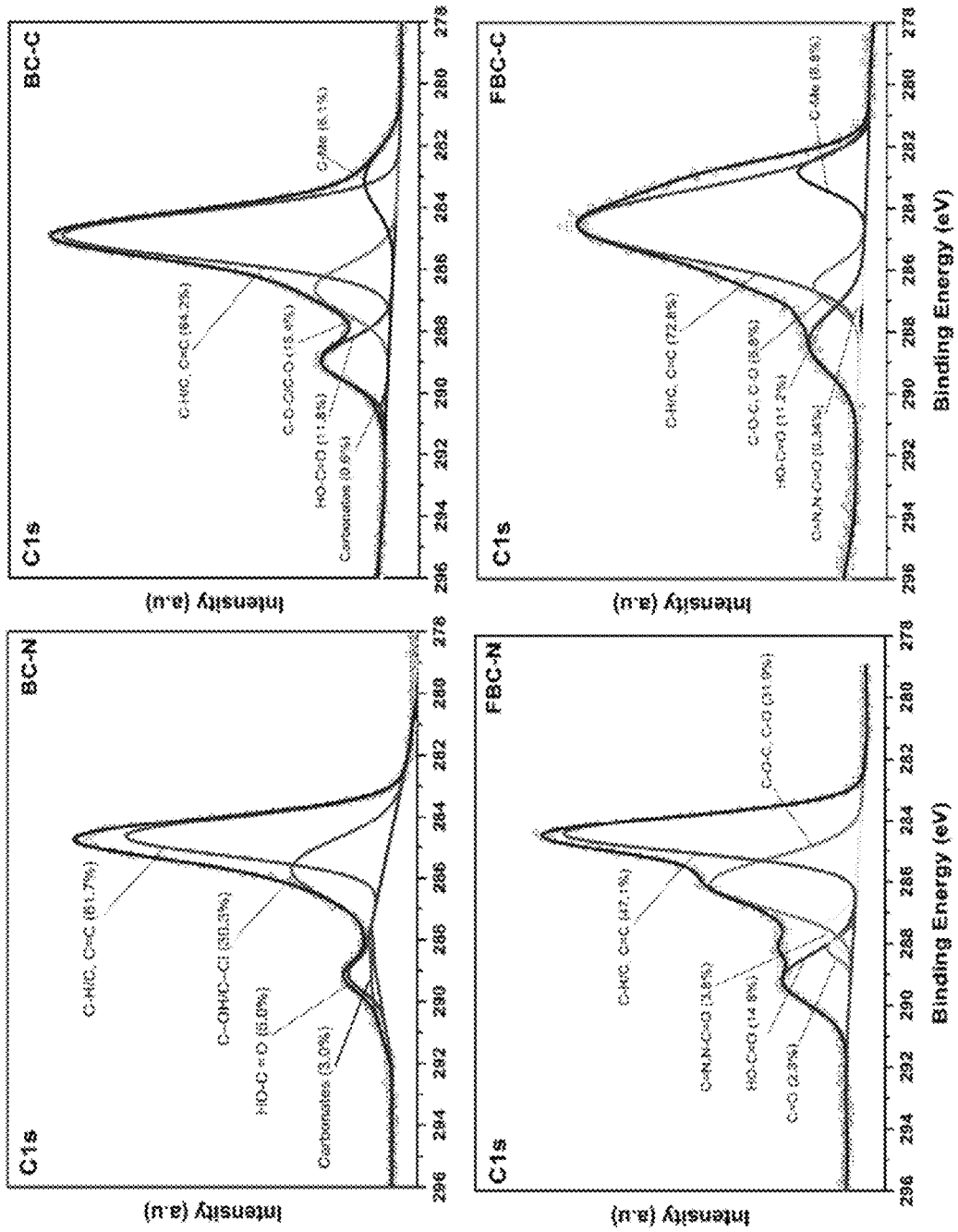
FIG. 3 shows XPS C1s deconvolution spectra of biochars produced under $N_2$ and $CO_2$ environments, and biochar-chitosan composite fibers of the present disclosure.

FIG. 3 shows the high-resolution C1s photoelectron spectra and their deconvolution results for the two biochars along with their corresponding FBCs. For BC-N, four different peaks were observed at 284.6, 285.7, 289.2, and 290.1 eV, which were attributed to C atoms in the form of C—H/C, C═C (61.7%), C—OH/C—Cl (30.3%), HO—C═O (5.0%), and carbonates (3.0%), respectively, with C—H/C, C═C having the most dominant peak. Similar peaks were observed for BC-C at different percentages; however, two new peaks were observed at 283.1 and 286.6 eV, which corresponded to C-metal (8.1%) and C—O—C/C═O (15.4%), respectively. Moreover, the C—OH/C—Cl peak was absent in the case of BC-C. In previous studies were obtained a similar result wherein biochar produced under $N_2$ environment showed —OH groups on the surface but did not show —OH group on the surface for biochar produced in a $CO_2$ environment. This could be due to the interaction between $CO_2$ and the base functional groups on the biochar surfaces.

In the case of FBC-N, five different peaks were observed at 284.4, 286.1, 287.5, 288.1, and 289.2 eV, which corresponded to C—H/C, C═C (47.1%), C—O—C, C—O (31.9%), C═N, N—C═O (3.8%), C═O (2.3%), and HO—C═O (14.8%), respectively.

For FBC-C, similar peaks were observed, except C═O. However, a new peak appeared at 282.8 eV, corresponding to C-metal (8.8%), and this represented carbon combined with metallic elements. The formation of organometallic $Ca_2C$ and/or $Fe_3C$ was likely triggered by the addition of $FeCl_3$ or Ca and Fe metals that were inherently present in PMS. The C-metal peak did not appear in either the FBC-N or BC-N C1s spectra.

In addition, Ca and Fe present in PMS were well-stabilized during the production of BC-C and were successfully embedded in FBC-C. Compared to biochars, FBCs had new N-containing peaks corresponding to C═N (62.4% in FBC-N) and N—C═O (5.6% in FBC-N and 65.9% in FBC-C). This could be due to the addition of N from chitosan during FBC preparation.

Figure 4:
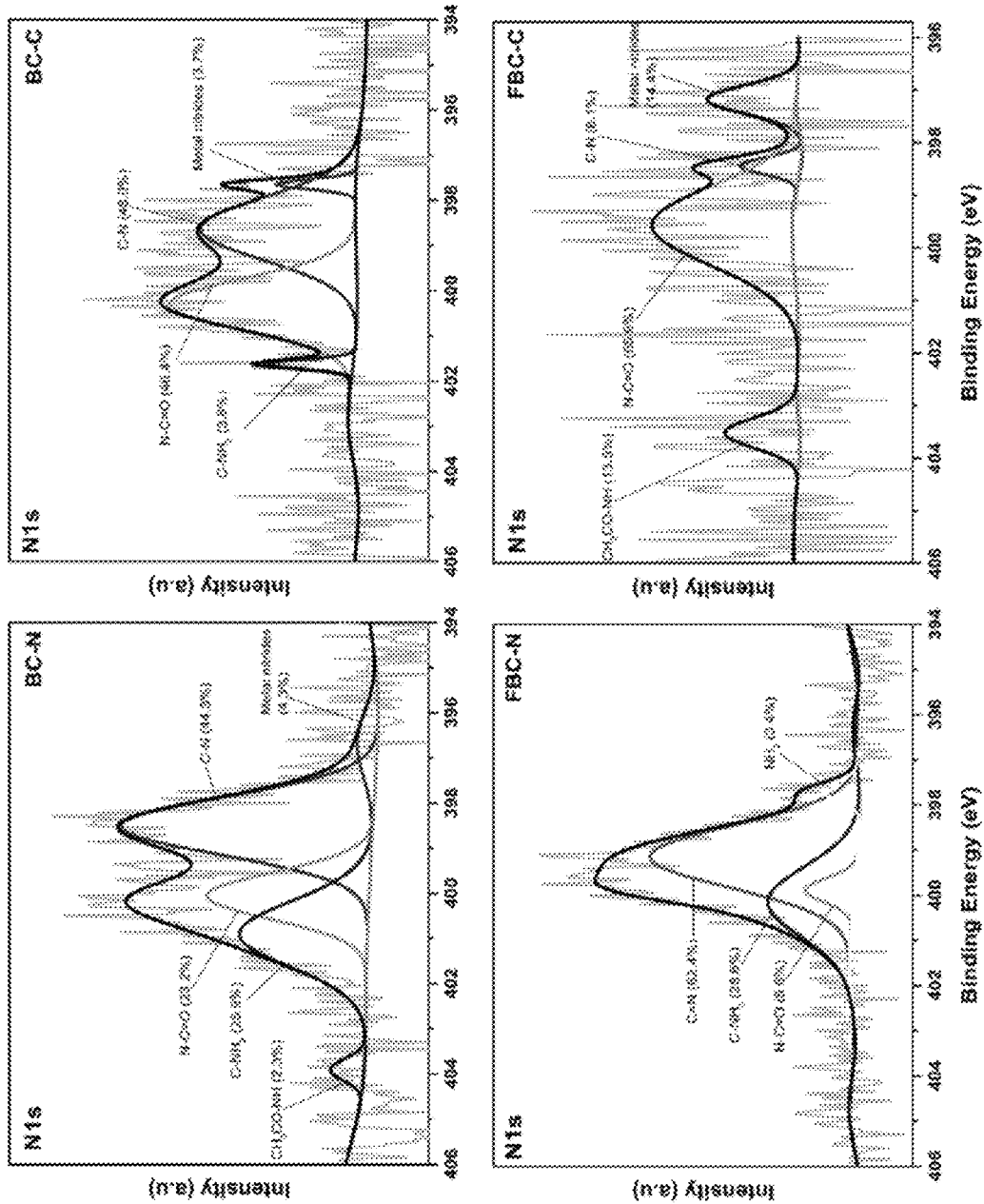
FIG. 4 shows XPS N1s deconvolution spectra of biochars produced under $N_2$ and $CO_2$ environments, and respective biochar-chitosan composite fibers of the present disclosure.

Furthermore, high-resolution N1s photoelectron spectra and their deconvolution results for BC-N, BC-C, FBC-N, and FBC-C are presented in FIG. 4.

Two dominant peaks, namely C—N and N—C═O were observed in both the biochars. BC-N had a lower proportion of C—N (44.3%) and N—C═O (23.2%) than BC-C (C—N: 46.0% and N—C═O: 46.4%). In BC-N, a peak centered at 403.9 eV represented the $CH_3CO$—NH group which was absent in BC-C. Moreover, the C—$NH_2$ group was observed in both the biochars; however, BC-N (25.9%) had a higher proportion of C—$NH_2$ than BC-C (3.8%).

Due to the acidic nature of $CO_2$, alkaline amines (—$NH_2$) could be neutralized by reacting with $CO_2$, thereby eliminating —$NH_2$ groups from biochar surfaces. This was the plausible reason for the disappearance of $CH_3CO$—NH from BC-C and the higher proportion of C—$NH_2$ groups on BC-N than BC-C.

In the FBC-N spectra, four different peaks centered at 397.7 (—$NH_2$), 399.1 (C═N), 399.9 (N—C═O), and 400.1 eV (C—$NH_2$) were observed (FIG. 4). In FBC-C, four peaks were centered at 397.2 (metal nitrides), 398.4 (C—N), 399.6 (N—C═O), and 403.5 eV ($CH_3CO$—NH). In FBC-N and FBC-C, the dominant peaks were C═N (62.4%) and N—C═O (65.9%), respectively.

Therefore, following the preparation of chitosan-biochar composite fibers, FCB-N was functionalized with C═N and —$NH_2$ groups, whereas FBC-C was functionalized with the $CH_3CO$—NH group. These groups were not present in the corresponding biochar. The difference in the Cs1 and N1s spectra between biochar and FBCs originates from the modification of pristine biochars with $FeCl_3$ and chitosan, respectively.

These results further confirmed that chitosan-biochar composite fibers were fabricated successfully by the method of the present disclosure.

<2-3> Raman Spectroscopy

The aromaticity and aliphaticity of the adsorbents, that is, the biochars and chitosan-biochar composite fibers prepared in the examples, were examined by Raman spectroscopy.

Figure 5:
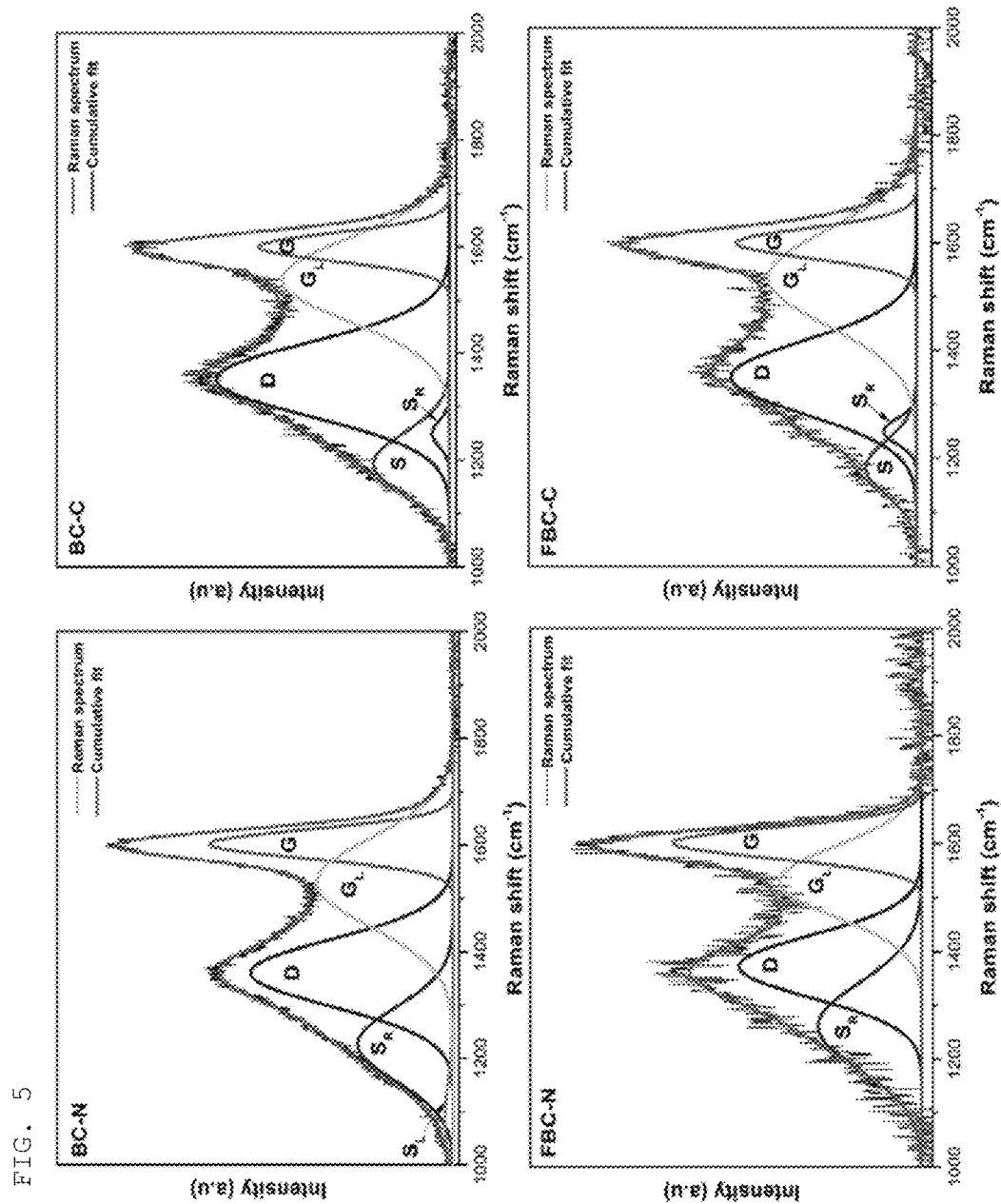
FIG. 5 shows Raman deconvolution spectra of biochars produced under $N_2$ and $CO_2$ environments, and respective biochar-chitosan composite fibers of the present disclosure.

The deconvoluted Raman spectra of all the four adsorbents in FIG. 5 revealed a D band between 1350 and 1372 cm⁻¹, which represented large aromatic ring systems containing six or more rings. The G band, between 1599 and 1601 cm⁻¹, represented the $sp^2$-bonded graphite crystallite and alkene C═C. Another major band (G) was observed between the D and G bands in all four adsorbents, which represented aromatics with 3-5 rings and amorphous carbon structures. Peak assignments for all characteristic subpeaks are listed in Table 2, below.

TABLE 2

| Assignments of characteristic peaks deconvoluted from the Raman spectra. | | |
|---|---|---|
| Band name | Position (cm⁻¹) | Assignment |
| $S_R$ | 1226-1262 | Aryl-alkyl ether; para-aromatics |
| S | 1183-1194 | $C_{alkyl}$-$C_{aryl}$ and —$CH_3$ on aromatic rings |
| $S_L$ | 1084 | C—H on aromatic rings; benzene (ortho-di-substituted) ring |

TABLE 2-continued

Assignments of characteristic peaks
deconvoluted from the Raman spectra.

| Band name | Position (cm$^{-1}$) | Assignment |
|---|---|---|
| D | 1350-1372 | Aromatics with no less than 6 rings but less rings than graphite |
| G | 1599-1601 | sp$^2$-bonded graphite crystallite and alkene C=C |
| GL | 1530-1538 | Aromatics with 3-5 rings and amorphous carbon |

TABLE 3

Ratio of integrated intensity (peak area (A)) of different peaks in Raman spectra for paper mill sludge biochar produced under N$_2$ environment (BC-N) and CO$_2$ environment (BC-C), and respective biochar-chitosan fibers (FBC-N and FBC-C).

| Sample | $A_D/A_G$ | $A_S/A_G$ |
|---|---|---|
| BC-N | 1.93 | — |
| BC-C | 3.16 | 0.86 |
| FBC-N | 1.50 | — |
| FBC-C | 2.54 | 0.51 |

The ratio of integrated intensity (peak area (A)) between the D and G bands ($A_D/A_G$) is an important measure to study the degree of aromaticity and crystalline or graphite-like carbon structures. A lower $A_D/A_G$ ratio implies more ordered carbon structures or a higher degree of graphitization of biochar. The $A_D/A_G$ ratios of BC-N, BC-C, FBC-N, and FBC-C are presented in Table 3. BC-N and FBC-N had lower $A_D/A_G$ ratios than BC-C and FBC-C, indicating the effect of biochar production atmosphere (CO$_2$ and N$_2$) on their properties. Biochar produced under a CO$_2$ environment was proven to have defective carbon structures due to the reaction of volatile organic matter of PMS with CO$_2$, which did not occur in the case of an N$_2$ environment. This could explain the higher $A_D/A_G$ ratios in adsorbents derived in a CO$_2$ environment than in an N$_2$ environment. However, the production of FBCs led to a decrease in the $A_D/A_G$ ratio compared to their corresponding biochars (Table 3). The $A_D/A_G$ ratio decreased from 1.93 in the case of BC-N to 1.50 with respect to FBC-N, whereas that of BC-C decreased from 3.16 to 2.54 for FBC-C. These results indicated that the production of FBCs tended to have more well-ordered carbon structures in the biochars (raw materials) used.

The S band represents $C_{aromatic}$-$C_{alkyl}$, aromatic (aliphatic) ethers, C—C on hydroaromatic rings, hexagonal diamond carbon sp$^3$, and C—H on aromatic rings. The ratio of $A_S/A_G$ could give an idea about the O-containing functional groups, or decarbonization and decarboxylation reactions in the materials. S bands were observed in BC-C and FBC-C, but not in BC-N and FBC-N (FIG. 5). Moreover, a high $A_S/A_G$ ratio of BC-C implied that BC-C underwent decarbonization and decarboxylation reactions and lost its O-containing functional groups during biochar production. The $A_S/A_G$ ratio also decreased in FBC-C following the fabrication of BC-C with chitosan (Table 3).

Example 3

Phosphorus (P) Adsorption Analysis of Chitosan-Biochar Composite Fibers

<3-1> Adsorption Isotherms

Amounts of P adsorbed at equilibrium P concentration on the four adsorbents were analyzed.

TABLE 4

Estimated adsorption isotherm model parameters for P adsorption onto biochar and biochar-chitosan fibers.

| Isothermal model | Parameters | Unit | BC-N | BC-C | FBC-N | FBC-C |
|---|---|---|---|---|---|---|
| Freundlich | K$_f$ | mg g$^{-1}$) (L mg$^{-1}$)$^{1/n}$ | 0.062 | 0.041 | 1.28 | 3.72 |
| | 1/n | L g$^{-1}$ | 1.15 | 1.02 | 0.67 | 0.39 |
| | R$^2$ | | 0.89 | 0.68 | 0.93 | 0.82 |
| | R$^2_{adj}$ | | 0.88 | 0.66 | 0.92 | 0.81 |
| | RMSEP | | 0.80 | 0.70 | 1.10 | 1.75 |
| | RPD | | 2.37 | 1.22 | 3.55 | 2.01 |
| Langmuir | q$_m$ | mg g$^{-1}$ | 9.63 | 8.56 | 16.43 | 19.24 |
| | b | L mg$^{-1}$ | 0.023 | 0.009 | 0.071 | 0.103 |
| | R$^2$ | | 0.69 | 0.71 | 0.82 | 0.89 |
| | R$^2_{adj}$ | | 0.67 | 0.69 | 0.81 | 0.88 |
| | RMSEP | | 1.22 | 0.67 | 1.80 | 1.36 |
| | RPD | | 0.98 | 1.25 | 1.52 | 2.75 |
| Sips | q$_m$ | mg g$^{-1}$ | 8.49 | 7.13 | 15.04 | 17.17 |
| | K$_s$ | L mg$^{-1}$ | 0.001 | 0.013 | 0.015 | 0.051 |
| | 1/n | | 1.92 | 0.99 | 1.89 | 1.51 |
| | R$^2$ | | 0.86 | 0.66 | 0.75 | 0.87 |
| | R$^2_{adj}$ | | 0.84 | 0.62 | 0.73 | 0.86 |
| | RMSEP | | 0.82 | 0.72 | 2.11 | 1.47 |
| | RPD | | 2.18 | 1.18 | 1.77 | 2.92 |
| Redlich-Peterson | K$_R$ | L g$^{-1}$ | 0.33 | 0.19 | 0.57 | 1.29 |
| | αR | L mg$^{-1}$ | 1.99 | 2.52 | 0.00009 | 0.008 |
| | g | | 0 | 0 | 2.36 | 1.54 |
| | R$^2$ | | 0.85 | 0.77 | 0.97 | 0.92 |
| | R$^2_{adj}$ | | 0.84 | 0.75 | 0.96 | 0.91 |
| | RMSEP | | 0.84 | 0.59 | 0.73 | 1.19 |
| | RPD | | 2.06 | 1.72 | 5.72 | 3.38 |

BC-N: Paper mill sludge biochar produced under N$_2$ environment; BC-C: Paper mill sludge biochar produced under CO$_2$ environment.
FBC-N: BC-N + chitosan composite fibers; FBC-C: BC-C + chitosan composite fibers.

Figure 6:
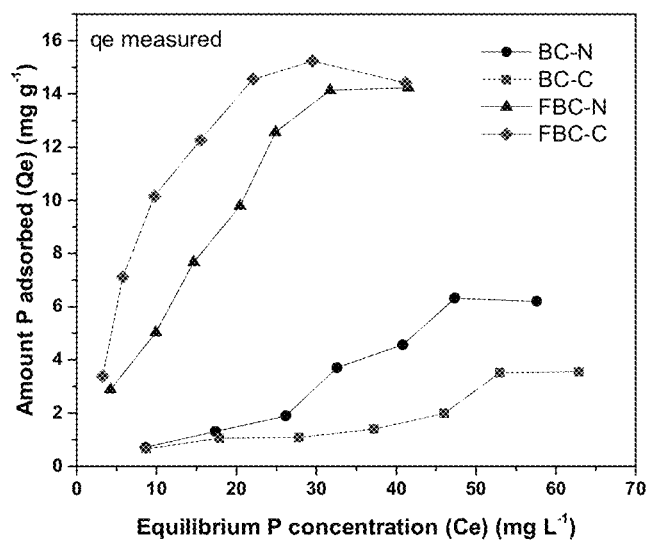
FIG. 6 shows amount measurements of P adsorbed at equilibrium P concentration onto biochars produced under $N_2$ and $CO_2$ environments, and respective biochar-chitosan composite fibers of the present disclosure.
Figure 7:
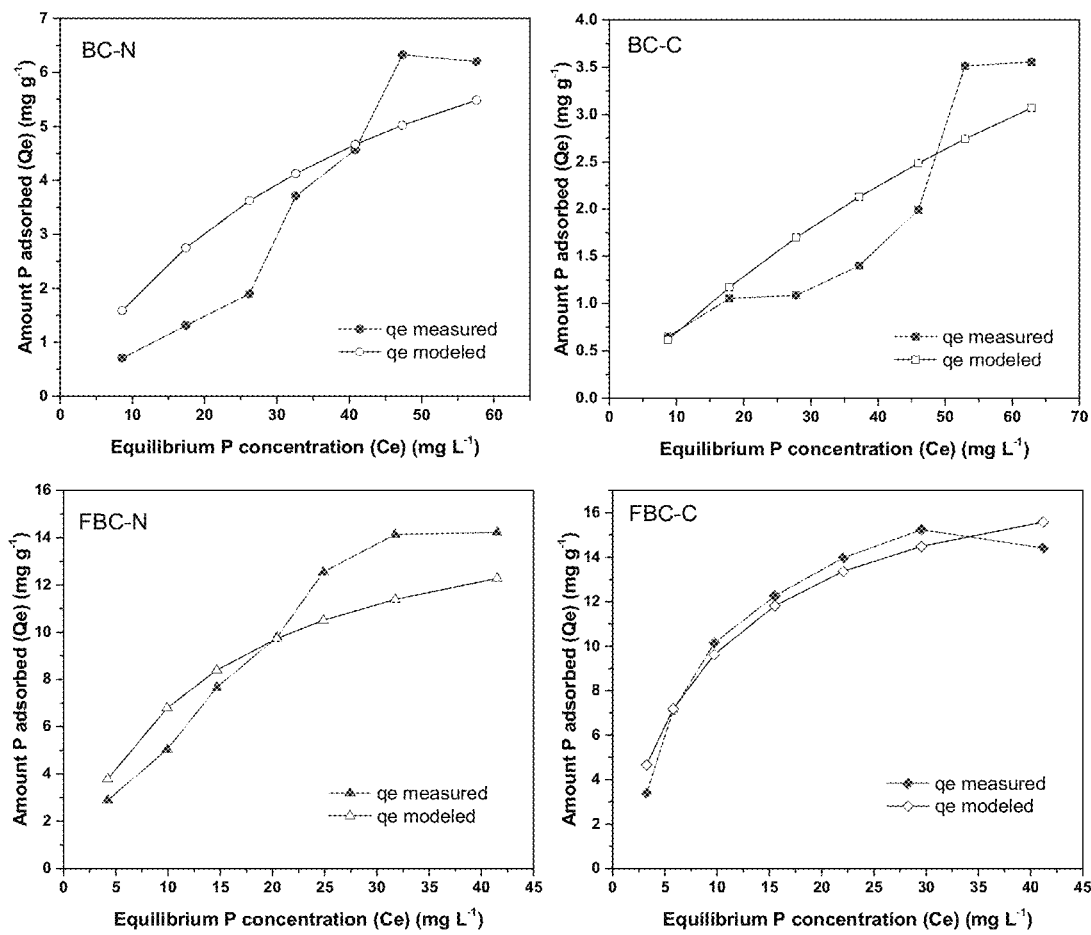
FIG. 7 shows non-linear fitting of the Langmuir isotherm model for P adsorption onto biochars produced under $N_2$ and $CO_2$ environments, and respective biochar-chitosan composite fibers of the present disclosure.
Figure 8:
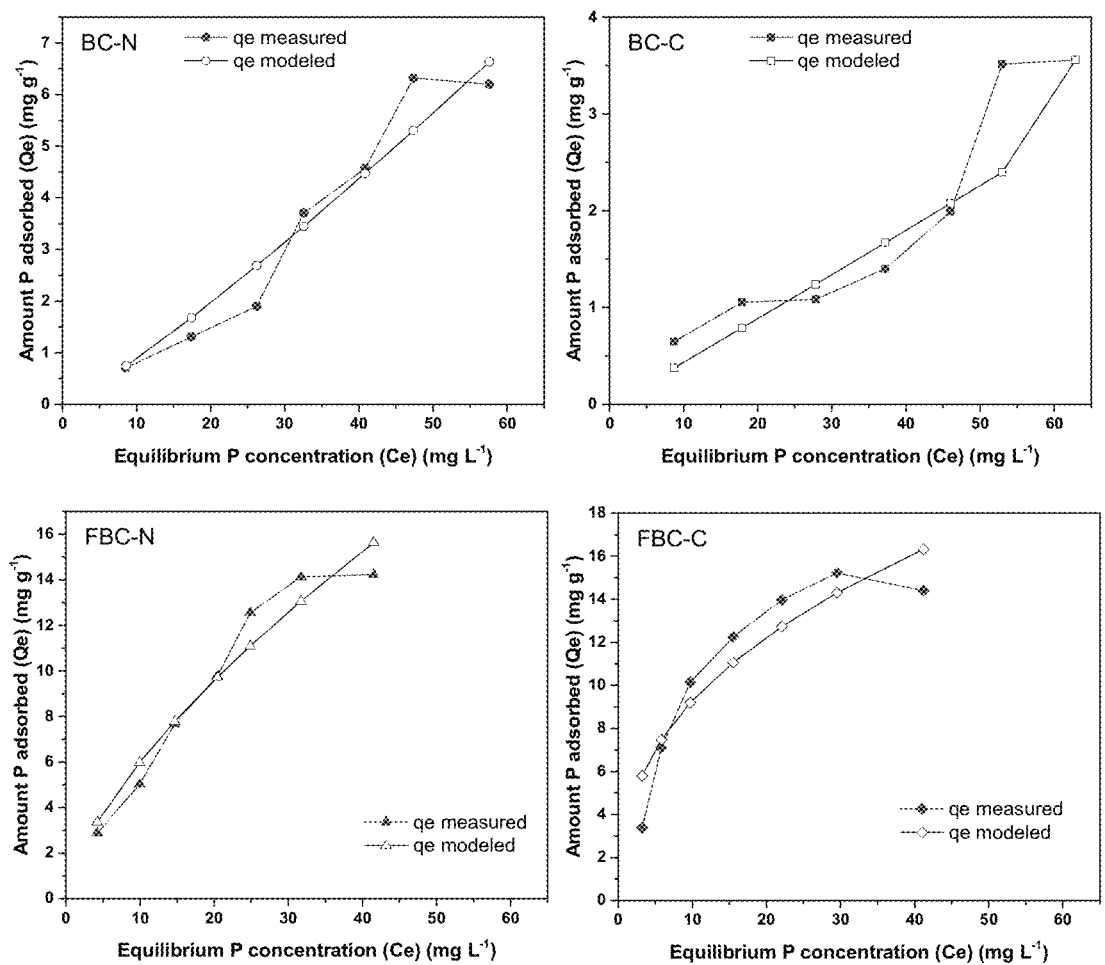
FIG. 8 shows non-linear fitting of the Freundlich isotherm model for P adsorption onto biochars produced under $N_2$ and $CO_2$ environments, and respective biochar-chitosan composite fibers of the present disclosure.
Figure 9:
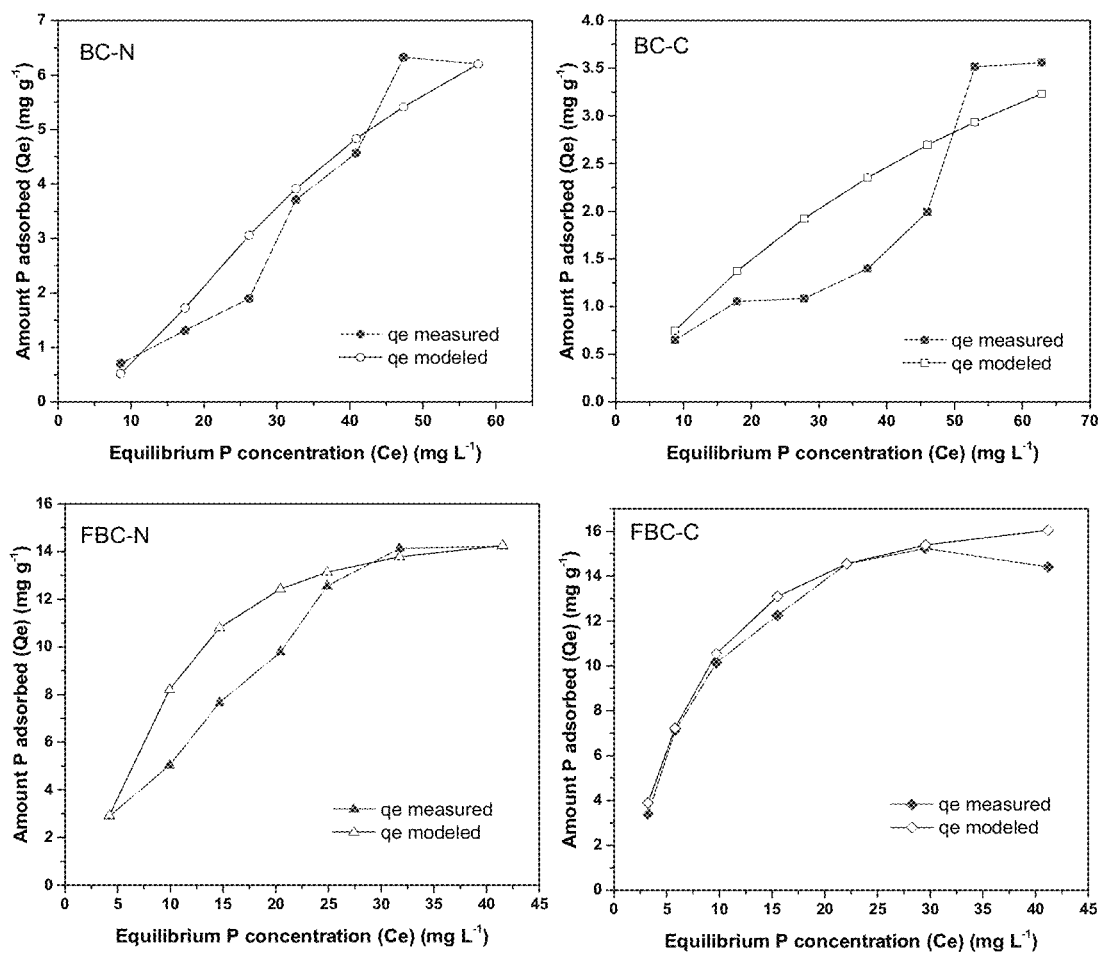
FIG. 9 shows non-linear fitting of the Sips isotherm model for P adsorption onto biochars produced under $N_2$ and $CO_2$ environments, and respective biochar-chitosan composite fibers of the present disclosure.
Figure 10:
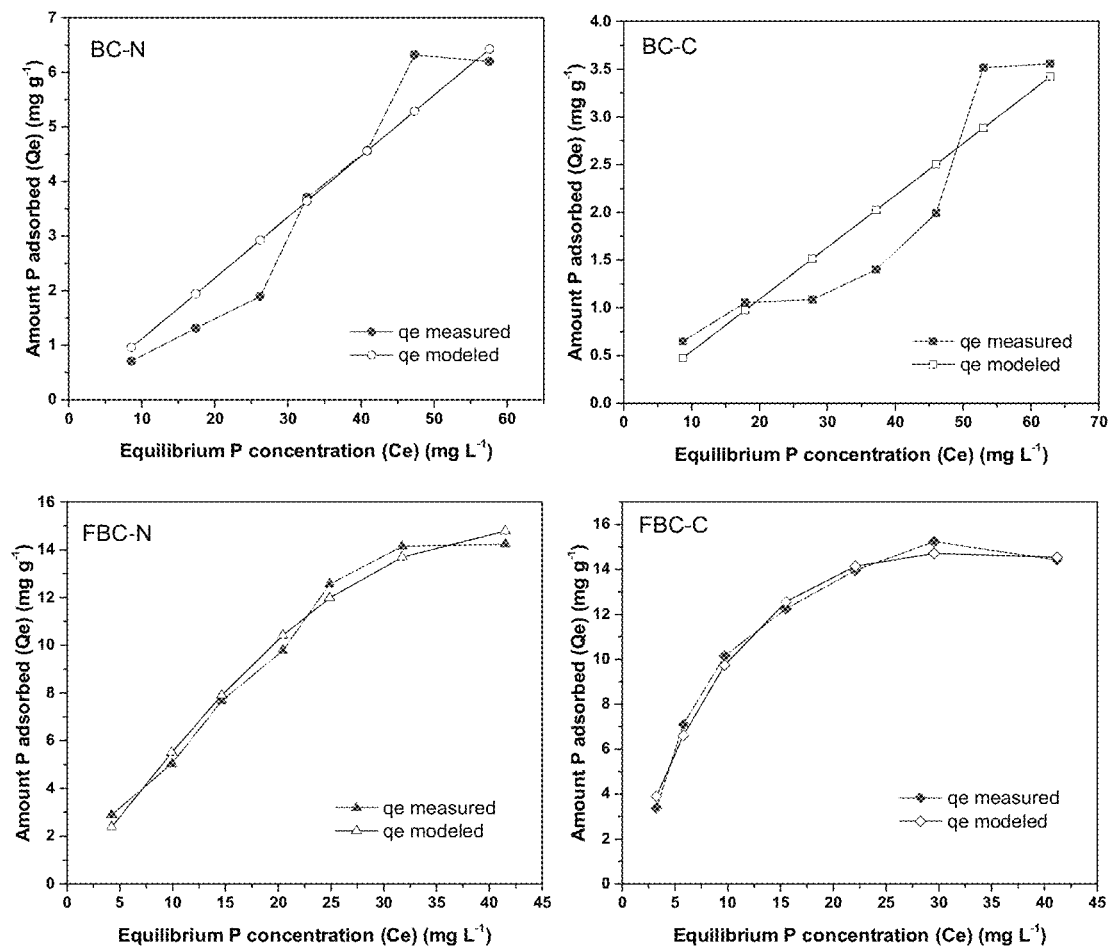
FIG. 10 shows non-linear fitting of the Redlich-Peterson isotherm model for P adsorption onto biochars produced under $N_2$ and $CO_2$ environments, and respective biochar-chitosan composite fibers of the present disclosure.

As shown in FIG. 6, the amount of P adsorbed followed the order of FBC-C>FBC-N>BC-N>BC-C. The P adsorption capacities increased with increasing equilibrium concentrations of all four adsorbents. The adsorption isotherm data were fitted to the Freundlich, Langmuir, Sips, and Redlich-Peterson models; the model fitting parameters are listed in Table 4. The non-linear fitting of each model is shown in FIGS. 7 to 10. BC-N was best fitted to the Freundlich isotherm with higher correlation coefficients ($R^2=0.89$) and higher ratio of performance to deviation (RPD=2.37). The Redlich-Peterson model provided a better fit for the adsorbents, such as BC-C ($R^2=0.77$; RPD=1.72), FBC-N ($R^2=0.97$; RPD=5.72), and FBC-C ($R^2=0.91$; RPD=3.38) with high $R^2$ and RPD values.

However, the Redlich-Peterson equation is a combination of Langmuir and Freundlich equations. If the exponent "g" of Redlich-Peterson equation tends to zero, the equation becomes more Freundlich. In contrast, the equation follows the Langmuir condition when the exponent "g" reaches one. As the "g" value for BC-C is zero, it is evident that BC-C follows Freundlich adsorption isotherm, whereas FBC-N (g=2.36) and FBC-C (g=1.54) follow Langmuir adsorption isotherms. This suggests that BC-N and BC-C have multilayer heterogeneous adsorbent surfaces with varying sites of adsorption, whereas the adsorption of P on FBCs is based on a homogeneous monolayer adsorption without interaction between the adsorbed ions.

The Langmuir maximum P adsorption capacities of FBC-C, FBC-N, BC-N, and BC-C were 9.63, 8.56, 16.43, and 19.24 mg g$^{-1}$, respectively (Table 4). The P adsorption capacities of the FBCs were much higher than those of the biochar, confirming that the modification with chitosan and Fe greatly contributed to the adsorption ability of the adsorbents.

Figure 11:
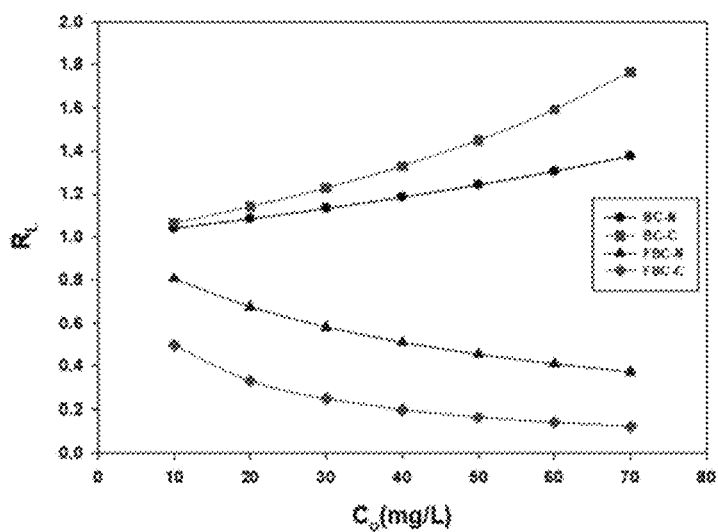
FIG. 11 shows separation factors ($R_L$) obtained from the Langmuir isotherm against initial P concentrations in water for biochars produced under $N_2$ and $CO_2$ environments, and respective biochar-chitosan composite fibers of the present disclosure.

The calculated $R_L$ value refers to the isotherm type that is unfavorable ($R_L>1$), linear ($R_L=1$), favorable ($0<R_L<1$), or irreversible ($R_L=0$). In this experiment, the $R_L$ values were <1 for FBCs, indicating that P adsorption was favorable; thus, adsorption on FBC-C was the most favorable among all the adsorbents (FIG. 11). However, the $R_L$ values of the biochars were >1, indicating that P adsorption was unfavorable for BC-N and BC-C, compared to the chitosan-biochar composite fibers (FBC). Therefore, the fabrication of biochars with chitosan and FeCl$_3$ transformed the unfavorable P adsorption into a favorable process for FBCs.

<3-2> Adsorption Kinetics

Figure 12:
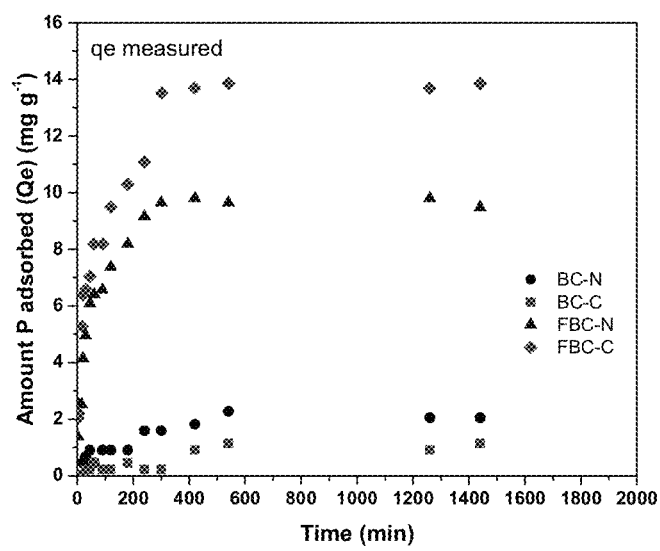
FIG. 12 shows kinetics of P adsorption onto biochars produced under $N_2$ and $CO_2$ environments, and respective biochar-chitosan composite fibers of the present disclosure.

The P adsorption process on biochars and FBCs was rapid in the first 4 hours; afterwards, it increased slowly until the plateau of adsorption equilibrium was achieved (FIG. 12). The P adsorption kinetic data were fitted to the PFO, PSO, intra-particle diffusion, and Elovich models; the model fitting parameters are listed in Table 3, below. The model fittings of the four adsorbents are shown in FIGS. 13-16. The results showed that the PFO model better fitted the experimental data of BC-N ($R^2=0.91$; RPD=3.41) and BC-C ($R^2=0.77$; RPD=1.98), suggesting that the adsorption process mainly depends on the equilibrium P concentration in the solution. In contrast, FBC-N ($R^2=0.97$; RPD=5.40) fitted well to the PSO model, indicating that P adsorption is a chemisorption process, which may involve a chemical reaction between PO$_4^{3-}$ and functional groups on the biochar surfaces. Moreover, it suggests that the adsorption rate of P is more dependent on the availability of adsorption sites on the surface of FBC-N than the P concentration in the solution. FBC-C showed the best fit with the Elovich model ($R^2=0.95$; RPD=4.33), which describes the chemical adsorption of P into FBC-C. The Elovich model further explains that the rate of adsorption decreases as surface area coverage increases.

<3-3> Effect of Solution pH and Adsorbent Dosage

The initial pH of the solution is a key factor that controls P adsorption. This is because pH affects the molecular form of P in the solution as well as the properties of adsorbents. When the solution pH is acidic (between 2-3.5), H$_3$PO$_4$ and H$_2$PO$_4^-$ are the dominant species of P. In contrast, when the pH is basic (between 9-11), HPO$_4^{2-}$ is the dominant species. Thus, the changes in solution pH can largely affect the P removal efficiency of an adsorbent by influencing P speciation and ionization in the solution.

Figure 13:
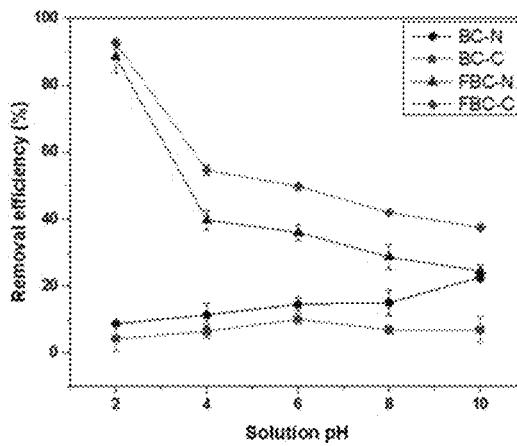
FIG. 13 shows effects of pH on P removal efficiency by biochars produced under $N_2$ and $CO_2$ environments, and respective biochar-chitosan composite fibers of the present disclosure.

Analysis was made of the pH range that has influences on the P removal efficiency of the biochars. The P removal efficiencies (%) of both biochars were higher at a pH range of 6-10, as compared to a lower pH range. However, FBCs showed high P removal efficiency in acidic pH, which decreased with increasing pH (FIG. 13). Although FBCs showed the highest P removal efficiency at pH 2, FBCs tended to dissolve under such strongly acidic conditions.

However, substantial P removal efficiency was observed at pH 4 for FBC-N (39.8%) and FBC-C (54.7%), whereas the corresponding biochars showed lower removal efficiency at all pH values compared to the FBCs (FIG. 13).

Chitosan is rich in amino groups that can be readily protonated, leading to the production of positively charged groups on FBCs under acidic conditions. Thus, greater P adsorption capacity at lower pH might be due to the electrostatic interactions between the P anions and positively charged surface of FBCs. Under alkaline conditions, electrostatic repulsion along with increased competition and diffusion resistance results from the elevated hydroxide ions, which leads to the reduction in P removal efficiency in the solutions.

Figure 14:
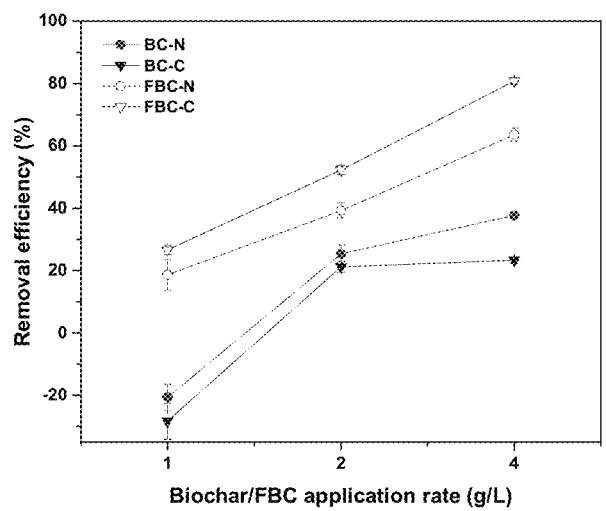
FIG. 14 shows effects of adsorbent dosage on phosphate removal efficiency by biochars produced under $N_2$ and $CO_2$ environments and respective biochar-chitosan composite fibers of the present disclosure.

As a result of analysis for P removal efficiency according to absorbent dosage, the P removal efficiencies increased with increasing adsorbent dosage, but the increment of P removal efficiency with the increase of dosage was observed to be remarkably low for the biochar, compared to FBC (FIG. 14). The increase in adsorbent dosage from 1 to 4 g L$^{-1}$ for FBC-N and FBC-C increased their P removal efficiencies from 18.6 to 63.6% and 26.6 to 80.8%, respectively (FIG. 14). This could be because an increase in the adsorbent dosage could increase the number of active sites <3-4> P Adsorption Mechanisms (Macroscopic Observation)

Adsorption isotherm and kinetic studies showed that the adsorption of P on biochars and chitosan-biochar composite fibers (FBCs) was dominated by chemisorption. As confirmed by the adsorption edge study (FIG. 13), electrostatic attraction between the positively charged surfaces of FBCs and P anions was the main mechanism for P adsorption. FBCs were rich in amine (—NH$_2$) and hydroxyl (—OH) functional groups due to the incorporation of chitosan. The —NH$_2$ and —OH groups were subjected to protonation under acidic conditions, leading to the formation of positively charged sites, thereby enabling the adsorption of P anions. In the case of biochar, low adsorption was observed under acidic conditions. Therefore, electrostatic attraction might not play an important role in P adsorption by biochar (FIG. 13). Ligand exchange between P anions (PO$_4^{3-}$, HPO$_4^{2-}$H$_2$PO$_4^-$, and H$_2$PO$_4^-$) as well as —OH and Cl$^-$ anions on the adsorbent surface could be another mechanism, as there were significant amounts of —OH and Cl$^-$ ions on the biochar and FBC surfaces (FIGS. 4 to 6). Moreover, abundant amounts of Mg, Al, Ca, and Fe on the biochar and FBC surfaces could stabilize P via chemical precipitation (FIGS. 2A and 2B).

Overall, the increased adsorption of P on FBCs over biochars was mainly due to the incorporation of chitosan and grafting of FeCl$_3$ in the fabricated adsorbents. The addition of chitosan and FeCl$_3$ not only facilitated the granulation of the biochar, but also significantly enhanced the adsorption capacity of P.

<3-5> P Adsorption Mechanism (Molecular Observation)

Figure 15:
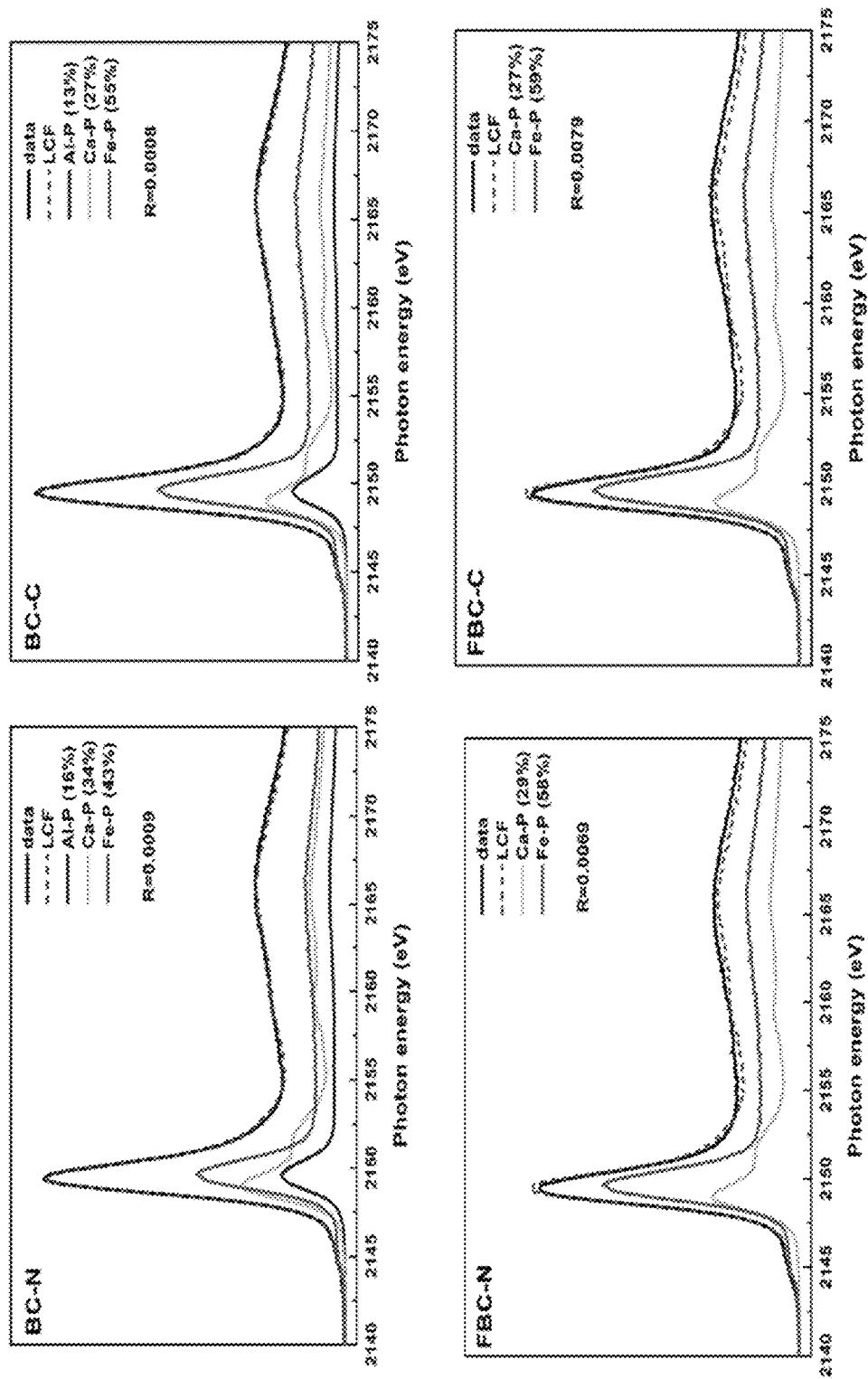
FIG. 15 shows P K-edge XANES spectra of biochars produced under $N_2$ and $CO_2$ environments, and respective biochar-chitosan composite fibers of the present disclosure, in which the black solid lines represent the linear combination fits (LCF) using P reference spectra.

Using P compounds suitable for LCF analysis, P K-edge XANES spectral analysis were performed on the biochars and chitosan-biochar composite fibers prepared under nitrogen and carbon dioxide conditions in the Example of the present invention As can be seen in FIG. 15, all XANES spectra of biochar samples had pre-edge peaks at approximately 2145 eV, indicating the presence of P associated with Fe. The XANES spectra of all samples were also characterized by the shoulder between 2151 and 2154 eV, indicating the presence of inorganic P species associated with Ca. In this experiment, it was understood that the XANES data could be used to determine the form (species) P in the samples, implying that the P in the samples was mainly present in an inorganic form.

As seen in Table 5, below, the results of LCF on BC-N demonstrated that P occurred mainly as Fe—P (43%) and Ca—P (34%), and to a lesser extent as Al—P (16%). The BC-C sample had similar P species and distribution as those in BC-C. In the biochar samples, Fe (39-47%), Ca (8-11%), and Al (1.5%) were the major components of the elements, suggesting that P possibly occurred with these metal cations.

The results of Table 5 demonstrated that biochar production under nitrogen ($N_2$) and carbon dioxide ($CO_2$) did not affect the mechanism of P adsorption. Up to 7% of P species in BC-C and BC-N were unidentified by LCF on the XANES spectra. In contrast to biochars, Fe—P was the primary species in FBC-N and FBC-C, accounting for approximately 58% of the total P. Ca—P was found to be a secondary species (~28%). Notably, Al—P in FBC-N and FBC-C was not identified in the best three results of LCF, corresponding to the much smaller Al concentrations (0.23-0.31%) than those in BC-C and BC-N. Overall, Fe—P was the primary species in all types of biochar samples; however, the contribution of Fe—P increased more in the chitosan-treated biochar fibers (FBC-N and FBC-C).

TABLE 5

Results of binary and ternary combinations of linear combination fit (LCF) on P K-edge XANES spectra of BC-N, BC-C, FBC-N, and FBC-C. The values in bold characters are used for the interpretation of LCF results.

| Sample | hydroxyapatite $Ca_5(PO_4)_3OH$ | P-ferrihydrite | $Ca_3(PO_4)_2$ | P-gibbsite | Strengite $FePO_4 \cdot 2H_2O$ | Variscite $AlPO_4 \cdot 2H_2O$ | Sum | R-factor |
|---|---|---|---|---|---|---|---|---|
| | | | | % | | | | |
| BC-N | 33 | 62 | | | | | 95 | 0.0014 |
| | | 63 | 29 | | | | 91 | 0.0017 |
| | 39 | | | 50 | | | 89 | 0.0038 |
| | 34 | 43 | | 16 | | | 93 | 0.0009 |
| BC-C | 26 | 71 | | | | | 97 | 0.0012 |
| | | 72 | 22 | | | | 94 | 0.0014 |
| | 32 | | | 58 | | | 90 | 0.0053 |
| | 27 | 55 | | 13 | | | 95 | 0.0008 |
| FBC-N | 29 | 58 | | | | | 86 | 0.0069 |
| | | 61 | 22 | | | | 83 | 0.0126 |
| | | | 35 | | 52 | | 87 | 0.0156 |
| | 28 | 50 | | | | 10 | 88 | 0.0055 |
| FBC-C | 27 | 59 | | | | | 86 | 0.0079 |
| | | 63 | 20 | | | | 83 | 0.0137 |
| | | | 33 | | 53 | | 87 | 0.0158 |
| | 27 | 49 | | | | 13 | 89 | 0.0056 |

R-factor is a residual value for fitting; $R = \Sigma(\mu_{exp} - \mu_{model})^2 / \Sigma(\mu_{exp})^2$
P-gibbsite, P-ferrihydrite: P adsorbed on gibbsite, and ferrihydrite, respectively Taken together, the results thus obtained reveal that the chitosan-biochar composite fibers prepared using chitosan in carbon dioxide and nitrogen gas conditions, respectively, according to the present disclosure have far greater potentials of adsorbing phosphorus from aqueous solutions than biochars and can find advantageous applications as adsorbents for removal of phosphorus aqueous solutions. Moreover, the chitosan-biochar composite fibers are easy to separate and collect after the adsorption process and thus enjoy the economical and eco-friendly advantages in terms of resource recycling.

While the present disclosure has been particularly shown and described with reference to exemplary embodiments thereof, it will be understood by those of ordinary skill in the art that various changes in form and details may be made therein without departing from the spirit and scope according to the present disclosure as defined by the following claims. Therefore, the disclosed embodiments should be considered in descriptive sense only and not for purposes of limitation. The scope of the present disclosure is shown in the claims rather than the foregoing description, and all differences within the scope will be construed as being included in the present disclosure.

What is claimed is:

1. A method for manufacturing a chitosan-biochar composite fiber for removal of phosphorus from aqueous solutions, the method comprising the steps of:
   (1) pyrolyzing paper mill sludge under a carbon dioxide ($CO_2$) or nitrogen ($N_2$) gas atmosphere to prepare a biochar;
   (2) mixing the biochar prepared in step (1) with a chitosan solution, together with $FeCl_3 \cdot 6H_2O$, followed by stirring to give a mixture;
   (3) extruding the mixture into a sodium hydroxide solution with aid of a needle for gel chitosan; and
   (4) crosslinking the gel chitosan in a glutaraldehyde solution and rinsing and neutralizing the same to afford the chitosan-biochar composite fiber.

2. The method of claim 1, wherein the pyrolysis in step (1) is carried out in a temperature range from 580 to 620° C. with a heating speed of 13-18° C./min.

3. The method of claim 1, wherein the chitosan solution in step (2) is a 3-5% (w/w) chitosan solution prepared with an acetic acid solution.

4. The method of claim 1, wherein $FeCl_3 \cdot 6H_2O$ in step (2) may be added in an amount 2- to 4-fold greater than the weight of the biochar.

5. The method of claim 1, wherein the sodium hydroxide solution in step (3) is a 1.5-2.5 M sodium hydroxide solution.

6. The method of claim 1, wherein the crosslinking in step (4) is carried out at a temperature of 20-25° C. for 1-3 hours.

7. A chitosan-biochar composite fiber for removal of phosphorus from aqueous solutions, manufactured by the method of claim 1.

8. A phosphorous adsorbent composition comprising the chitosan-biochar composite fiber manufactured by the method of claim 1 as an active ingredient.

9. The phosphorous adsorbent composition of claim 8, being adapted to remove phosphorus from aqueous solutions.

10. The phosphorus adsorbent composition of claim 8, wherein the phosphorus adsorbent composition exhibits an increased phosphorus adsorption efficiency in an acidic condition.

11. The phosphorus adsorbent composition of claim 10, wherein the acidic condition includes a pH of 2-4.

* * * * *